July 17, 1951      J. R. WIRT      2,560,678

METHOD OF WELDING

Filed July 8, 1949

INVENTOR
JOHN R. WIRT
BY Spencer Hardman & John
HIS ATTORNEYS

Patented July 17, 1951

2,560,678

UNITED STATES PATENT OFFICE 2,560,678

METHOD OF WELDING

John R. Wirt, Anderson, Ind., assignor to General Motors Corporation, Detroit, Mich., a corporation of Delaware Application July 8, 1949, Serial No. 103,574

3 Claims. (Cl. 219—10)

This invention relates to the art of joining electric wires to terminal members by electric welding.

An object of the invention is to permanently unite the wire and the terminal member by welding in a manner such that the unsupported portion of the wire, which may be subjected to vibration, will not break. In the disclosed examples of the practice of the invention, this object is accomplished by causing the wire to be compressed during the welding operation in a manner such that the portion of the wire attached to the terminal tapers gradually from full cross section of the wire to a thin edge and spreads to increase the area of the bond.

Further objects and advantages of the present invention will be apparent from the following description, reference being had to the accompanying drawings wherein a preferred embodiment of the present invention is clearly shown.

Figure 25:
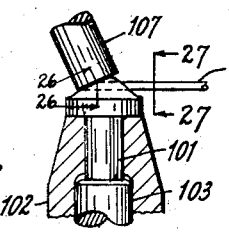
Fig. 25 is a view similar to Fig. 24 showing the upper electrode in welding position.
Figure 26:
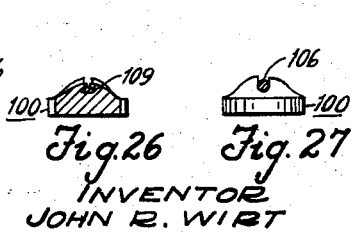
Figure 27:
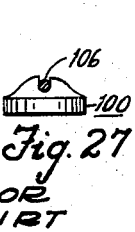

Figs. 26 and 27 are sectional views taken, respectively on lines 26—26 and 27—27 of Fig. 25.

Figure 1:
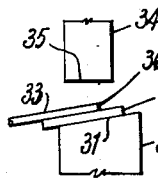
Fig. 1 is a diagram of apparatus for welding a wire to a terminal plate.
Figure 2:
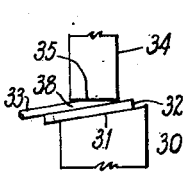
Fig. 2 is a view similar to Fig. 1 showing the apparatus in welding position.
Figure 3:
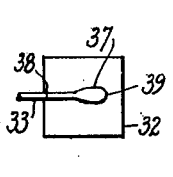
Fig. 3 is a plan view of the wire welded to the terminal plate.

Referring to Fig. 1 a fixed electrode 30 has an inclined surface 31 upon which a terminal plate 32 is placed. The wire 33 to be welded to the plate 32 is placed on the plate 32 as shown in Fig. 1. A vertically movable upper electrode 34 is provided with a surface 35 at right angles to the direction of its movement and therefore making an acute angle with the surface 31 of the electrode 30. As electrode 34 descends to perform the welding operation this electrode first touches the wire at the corner portion 36 where the heat is localized and the wire starts to soften. As electrode 34 continues to descend the wire spreads out as indicated at 37 in Fig. 3 thus providing a wedge-like portion of the wire with tapers from the full cross-section of the wire at 38 down to a thin edge at 39. The terminal 32 may be made of steel plated with zinc. The wire 33 being of copper, the bond between the wire and the terminal is a layer of brass formed by the alloying of the copper with zinc plating of the terminal 32.

Figures 4, 5:
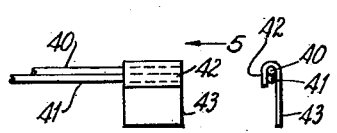
Fig. 4 is a plan view of a clip receiving two wires.
Fig. 5 is a view in the direction of arrow 5 of Fig. 4.
Figure 6:
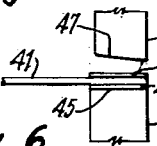
Fig. 6 is a view of the terminal clip and wires placed between two electrodes.
Figure 7:
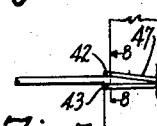
Fig. 7 is a view similar to Fig. 6 showing electrodes in welding position.
Figure 8:
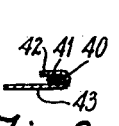
Fig. 8 is a sectional view on line 8—8 of Fig. 7.
Figure 9:
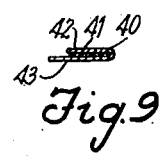
Fig. 9 is a sectional view on line 9—9 of Fig. 7.
Figure 10:
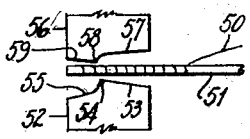
Fig. 10 shows a fine wire wrapped around a heavy wire and placed between welding electrodes.
Figure 11:
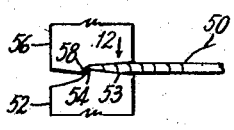
Fig. 11 is a view similar to Fig. 10 showing the electrodes in welding position.

Referring to Fig. 4, two copper wires 40 and 41 are placed within a loop or hook 42 of a copper terminal 43. This assembly is placed between the lower electrode 44 having a horizontal face 45 and an upper electrode 46 having an inclined face 47 making an acute angle with the face 45 as shown in Fig. 6. During the welding operation the upper electrode 46 descends and causes the hook portion 42 of the terminal 43 to be deformed as shown in Fig. 7 and the wires between these parts to be deformed from full cross section as shown in Fig. 8 to flat and thin cross-section as shown in Fig. 9. The copper wires and the copper clip are fused together to provide a permanent connection. The portions of the wires contiguous to the weld are full cross-section so that they have full strength to resist breaking of the wires due to vibration of free portions thereof relative to the terminal 43 which is fixed.

Figure 12:
Fig. 12 is a view in the direction of arrow 12 of Fig. 11 showing the fine wire fused to the heavy wire.

A fine wire 50 which is to be welded to a coarse wire 51 is wrapped about the coarse wire and placed between electrodes 52 and 56. Electrode 52 has an inclined surface 53, an edge 54 and an outwardly flaring surface 55. Electrode 56 has an inclined surface 57, an edge 58 and an outwardly flaring surface 59. When the electrode 56 is caused to descend upon the work, the edges 54 and 58 of the electrodes first engage the work and start the fusion thereof and cause the excess material to the left of these edges to be melted off while the surfaces 53 and 57 cause the work to be squeezed into wedge-like formation 60 shown in Fig. 12. The free portions of the wire remain at full cross-section so as to have full strength to resist breakage due to vibration.

Figure 13:
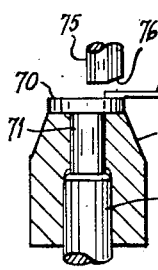
Fig. 13 is a view of the apparatus used for welding a wire to a switch contact member.
Figure 14:
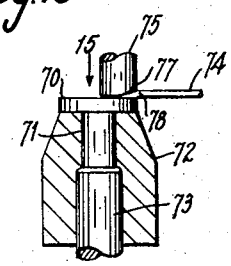
Fig. 14 is a view similar to Fig. 13 showing the upper electrode in welding position.
Figure 15:
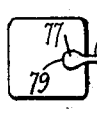
Fig. 15 is a view in the direction of arrow 15 of Fig. 14 showing the wire welded to the switch contact.

Referring to Fig. 13 a switch contact member 70 having a cylindrical shank 71 is placed in a work holder 72 which receives a lower electrode 73 making contact with the shank 71. The wire 74 to be joined to the contact 70 is placed upon it as shown in Fig. 13 and an upper electrode 75 having an inclined surface 76 is caused to descend into the position shown in Fig. 14 to cause the wire to be deformed into a wedge-shaped portion 77 which tapers from full cross-section at 78 to a very thin edge at 79.

Figure 16:
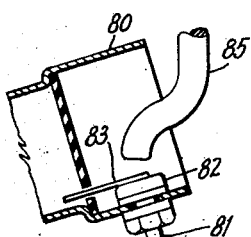
Fig. 16 shows apparatus for welding a wire to a terminal screw supported by a case.
Figure 17:
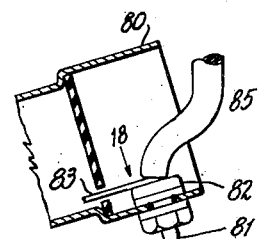
Fig. 17 is a view similar to Fig. 16 showing the upper electrode in welding position.
Figure 18:
Fig. 18 is a view in the direction of arrow 18 of Fig. 17 showing the wire welded to the terminal screw.
Figure 19:
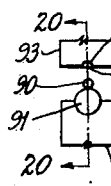
Fig. 19 is a diagram of apparatus for welding a wire to a rod of larger diameter, this view being in the direction of arrow 19 of Fig. 20.
Figure 20:
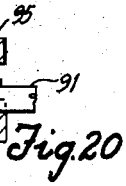
Fig. 20 is a sectional view on line 20—20 of Fig. 19.
Figure 21:
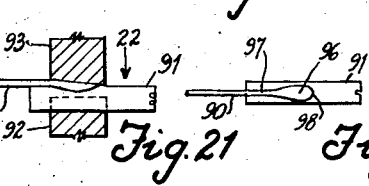
Fig. 21 is a view similar to Fig. 20 showing the upper electrode in welding position.
Figure 22:
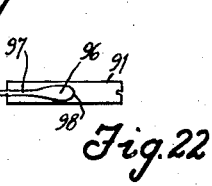
Fig. 22 is a view in the direction of arrow 22 of Fig. 21 showing the wire welded to the rod.
Figure 23:
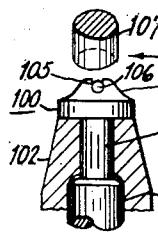
Fig. 23 is a view in the direction of arrow 23 of Fig. 24 and shows hot-upsetting apparatus for attaching a wire to a terminal having a wire receiving groove.
Figure 24:
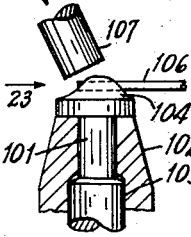
Fig. 24 is a view in the direction of arrow 24 in Fig. 23.

Fig. 16 shows a metal case 80 supporting an insulated terminal screw 81, the head 82 of which is to be joined by welding to a wire 83. While the case 80 is held by the hand in a position such that the screw 81 contacts a lower electrode 84, an upper electrode 85 is caused to descend from the position shown in Fig. 16 to that shown in Fig. 17 to cause the end of the wire 83 to be formed into a wedge shaped portion 86 (Fig. 18) which tapers from full diameter of the wire 86 to a thin edge 88.

When a small copper wire 90 is to be joined to a steel rod 91, preferably zinc plated, the rod is located in a recess provided by a lower electrode 92. The upper electrode 93 is provided with a notch 94 defined by a tapering surface 95 whereby the wire 90 is caused to be deformed to provide a portion 96 tapering from full section of the wire at 97 to a thin edge at 98. The portion 96 is bonded to the steel wire through a brass bond formed by the alloy of copper with the wire with the zinc plating on the steel rod.

The welding of a wire to a terminal having a wire receiving notch by the hot upsetting welding of metals is shown in Figs. 23 to 27. A terminal 100 has a shank 101 which is received by workholder 102 and is engaged by a lower electrode 103. The terminal 100 has a boss 104 providing a notch 105 for receiving a wire 106. The upper electrode 107 is mounted for movement in the direction of arrow 108. As it moves from the position shown in Fig. 24 to that shown in Fig. 25, it engages a corner of the boss 104 and causes it to be deformed as shown in Fig. 26, thereby squeezing the wire into a flat oblong shape as shown at 109. The portion of the wire joined to the terminal by welding tapers from full section as shown in Fig. 27 to a relatively flat portion shown at 109 in Fig. 26. If the terminal 101 is made of steel and zinc plated the wire will be united with the terminal by a brass bond.

In each of the examples disclosing the practice of the invention, the heating of the wire by passage of electric current and the application of pressure thereto causes that portion of the wire united with the terminal to taper from full wire diameter to a thin edge and to flow laterally to increase the area of the bond. Thus there is provided a weld-wedge of wire material which unites the unsupported portion of the wire with the terminal. The shaping of the united portion of the wire is accomplished by providing an acute angle relation between the work engaging surface of the movable electrode and the work support and therefore between the said surface and the surface of the terminal member against which the wire is pressed. Initially the welding current enters the wire at a portion thereof of relatively small contact area so that the current intensity per unit area is initially high and the temperature of the wire is quickly raised to the melting point. As the movable electrode continues to approach the work support, the contact area increases and the current intensity per unit area decreases. In this way the wire can be softened to the fusion point without causing it to become entirely fluid and flow away. The movement of the movable electrode toward the terminal to which the wire is united is stopped by engagement of that electrode with the work at the thin edge of the weld-wedge, thus leaving that portion of the wedge contiguous to the unwelded portion of the wire at full diameter. Preferably the said contiguous portion is located inside the boundary of the terminal.

While the embodiment of the present invention as herein disclosed, constitutes a preferred form, it is to be understood that other forms might be adopted.

What is claimed is as follows:

1. The method of uniting a wire with another electrically conducting member which comprises supporting a wire of substantial diameter and member between electrodes connected with a welding current source, one of the electrodes having an electrical connection with the member and the other electrode, which is movable, having a surface making an acute angle with the wire longitudinally thereof, reducing the thickness of the wire and simultaneously spreading the wire into a larger area contacting surface by causing the movable electrode to move to squeeze the wire while electric current passes between the electrodes whereby the wire portion providing the union between the wire and the member is of wedge-like formation tapering from full diameter of the wire to a thin edge and spreading out to increase the area of the bond, the unattached wire immediately contiguous to the wedge remaining at full diameter.

2. The method according to claim 1 in which the wire is of copper and the member is zinc plated steel and in which the copper alloys with the zinc plating on the steel member to provide a brass bond between the wedge-like formation of the copper wire and the steel member.

3. The method of uniting a wire with another electrically conductive member which comprises providing an electrically conductive member having a groove therein of a predetermined depth, assembling a wire in said groove so that at least a portion of the wire extends past the end of the groove in said electrically conductive member and wherein the wire is of a diameter slightly less than the depth of the groove, supporting the electrically conductive member in an electrode, contacting the exposed end of the wire with a moving electrode, welding the wire to the electrically conductive member by passing current through the wire, member and electrodes and through the contacting areas thereof whereby the moving electrode through pressure, movement and heat generated at the weld causes the exposed end of the wire to flare out and weld to the member and to form a mechanical interlock with the end of the groove in the member.

JOHN R. WIRT.

REFERENCES CITED

The following references are of record in the file of this patent:

UNITED STATES PATENTS

| Number | Name | Date |
|---|---|---|
| 1,961,144 | Griffith | June 5, 1934 |
| 2,190,621 | Baer | Feb. 13, 1940 |

OTHER REFERENCES

"Resistance Welding Data Book"; Third Edition, page 126, December 1944, P. R. Mallory and Co., Inc., Indianapolis 6, Indiana.